(12) United States Patent
Imamura et al.

(10) Patent No.: US 9,969,381 B2
(45) Date of Patent: May 15, 2018

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventors: Tatsuya Imamura, Okazaki (JP); Atsushi Tabata, Okazaki (JP); Ryuji Ibaraki, Miyoshi (JP); Yuji Yasuda, Miyoshi (JP); Yoshihito Kanno, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 1 day.

(21) Appl. No.: 15/101,246

(22) PCT Filed: Dec. 2, 2014

(86) PCT No.: PCT/JP2014/081863
§ 371 (c)(1),
(2) Date: Jun. 2, 2016

(87) PCT Pub. No.: WO2015/083696
PCT Pub. Date: Jun. 11, 2015

(65) Prior Publication Data
US 2016/0304078 A1 Oct. 20, 2016

(30) Foreign Application Priority Data

Dec. 5, 2013 (JP) .................................. 2013-251847

(51) Int. Cl.
*B60W 20/00* (2016.01)
*B60K 6/445* (2007.10)
(Continued)

(52) U.S. Cl.
CPC ............. *B60W 20/00* (2013.01); *B60K 6/445* (2013.01); *B60K 6/547* (2013.01); *B60L 11/14* (2013.01);
(Continued)

(58) Field of Classification Search
CPC .. F02D 41/042; F02D 41/0055; F02D 41/005; F02D 41/0077; B60Y 2400/442;
(Continued)

(56) References Cited

U.S. PATENT DOCUMENTS

2010/0235070 A1* 9/2010 Amano ................. B60W 20/15
701/103
2012/0303249 A1 11/2012 Minami et al.

FOREIGN PATENT DOCUMENTS

JP 2010-076596 A 4/2010
JP 2010-138746 A 6/2010
(Continued)

*Primary Examiner* — Yuen H Wong
(74) *Attorney, Agent, or Firm* — Hunton Andrews Kurth LLP

(57) ABSTRACT

A control apparatus for a hybrid vehicle controls a hybrid vehicle, the hybrid vehicle including: a power source including an internal combustion engine and an electric; a recirculating device configured to recirculate an exhaust gas from an exhaust side to an intake side of the internal combustion engine; and a recirculation amount adjusting device configured to adjust an amount of the recirculation by the recirculating device. The control apparatus for a hybrid vehicle is provided with: a determining device configured to determine whether or not the internal combustion engine is stopped and electric running by the electric motor can be performed if the hybrid vehicle runs while operating the internal combustion engine; and a recirculation controlling device configured to control the recirculation amount adjusting device such that the amount of the recirculation by the recirculating device is larger than an amount when it is determined that the electric running cannot be performed, if it is determined that the electric running can be performed. This makes it possible to preferably prevent a misfire of the internal combustion engine.

2 Claims, 12 Drawing Sheets

(51) Int. Cl.
  *B60K 6/547*  (2007.10)
  *B60L 11/14*  (2006.01)
  *B60W 10/06*  (2006.01)
  *B60W 10/08*  (2006.01)
  *F02D 41/04*  (2006.01)
  *F02D 41/00*  (2006.01)
  *F02N 11/04*  (2006.01)
  *F02N 11/08*  (2006.01)

(52) U.S. Cl.
  CPC ............ *B60W 10/06* (2013.01); *B60W 10/08* (2013.01); *F02D 41/005* (2013.01); *F02D 41/0055* (2013.01); *F02D 41/0077* (2013.01); *F02D 41/042* (2013.01); *B60Y 2400/442* (2013.01); *F02N 11/04* (2013.01); *F02N 11/0818* (2013.01); *Y02T 10/47* (2013.01); *Y02T 10/6239* (2013.01); *Y02T 10/6286* (2013.01)

(58) Field of Classification Search
  CPC ......... B60K 6/445; B60K 6/547; B60L 11/14; B60W 10/06; B60W 10/08; B60W 20/00; Y02T 10/6286; Y02T 10/6239; Y02T 10/47; F02N 11/04; F02N 11/0818
  See application file for complete search history.

(56) References Cited

FOREIGN PATENT DOCUMENTS

| | | |
|---|---|---|
| JP | 2011-195075 A | 10/2011 |
| JP | 2012-246850 A | 12/2012 |

\* cited by examiner

FIG. 2

|  |  |  |  | C1 | B1 | MG1 | MG2 |
|---|---|---|---|---|---|---|---|
| EV | Move forward/ backward | Single drive | Drive |  |  | G | M |
|  |  |  | With Engine brake | △ | △ | G | M |
|  |  | Double drive |  | O | O | M | M |
| HV | Move forward | HIHG |  |  | O | G | M |
|  |  | LOW |  | O |  | G | M |
|  | Move backward | LOW |  | O |  | G | M |

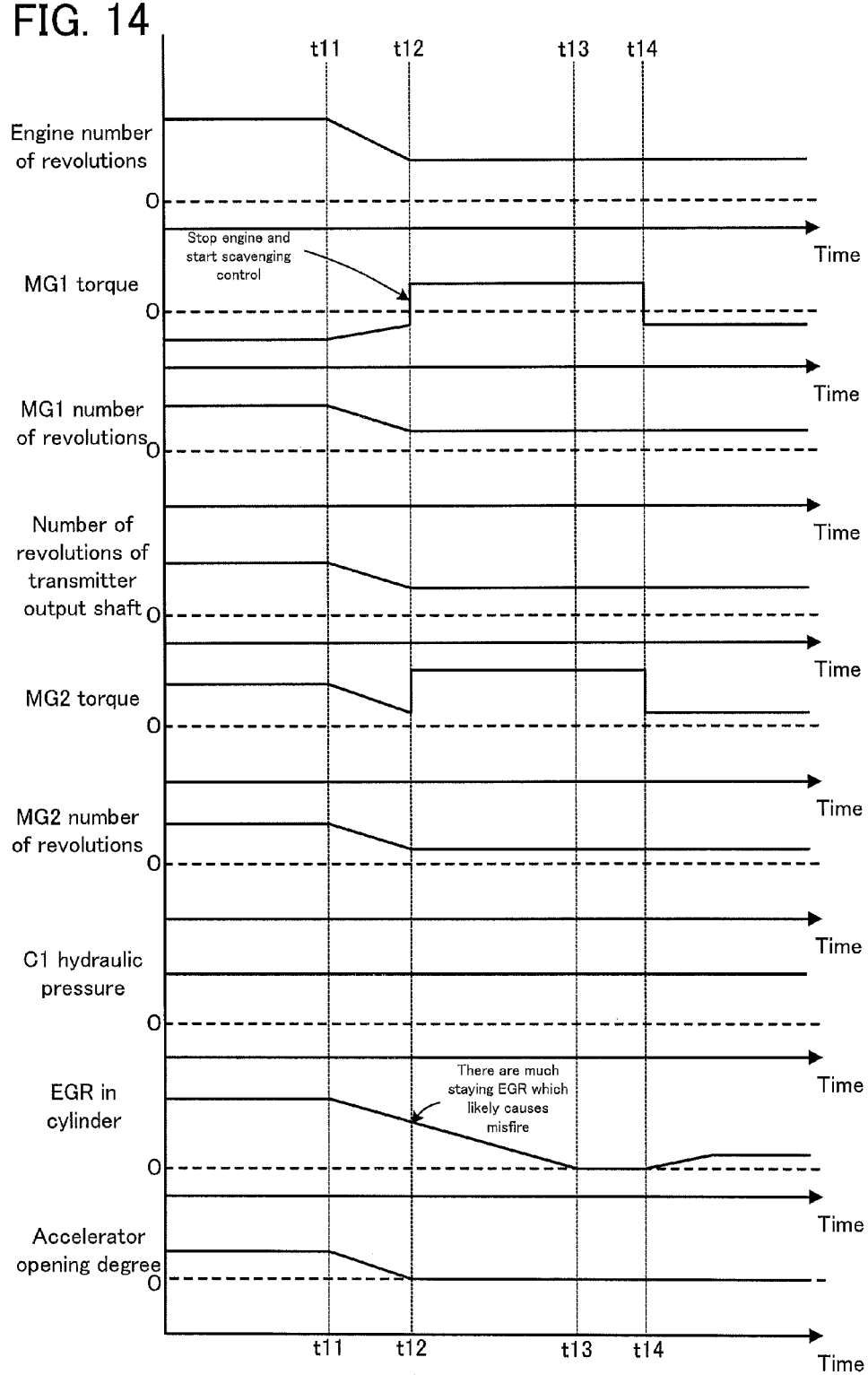

CONTROL APPARATUS FOR HYBRID VEHICLE

CROSS-REFERENCE TO RELATED APPLICATIONS

This is a national phase application based on the PCT International Patent Application No. PCT/JP2014/081863 filed Dec. 2, 2014, claiming priority to Japanese Patent Application No. 2013-251847 filed Dec. 5, 2013, the entire contents of both of which are incorporated herein by reference.

TECHNICAL FIELD

The present invention relates to a control apparatus for a hybrid vehicle, configured to control a hybrid vehicle provided, for example, with an internal combustion engine and an electric motor as a power source.

BACKGROUND ART

The vehicle using the internal combustion engine as the power source adopts an exhaust gas recirculation (EGR) system for recirculating a part of exhaust gases to an intake passage in some cases, for example, for purpose of fuel efficiency improvement and exhaust emission improvement or for similar purposes.

The internal combustion engine that adopts the EGR system can enjoy the aforementioned beneficial effect, while an EGR gas retained in the intake passage (e.g. an EGR gas retained when a throttle opening degree is controlled to be on a closed side) could cause a misfire in the internal combustion engine. Thus, in Patent Literature 1, there is proposed a technology in which the throttle opening degree is controlled to be on an open side (e.g. to be fully open) to accelerate scavenging of the EGR gas and in which the load torque is controlled so as to absorb a torque change caused by scavenging control, in fuel cut control during deceleration of a vehicle.

There are Patent Literatures 2 and 3 as prior art literatures related to the present invention.

CITATION LIST

Patent Literature

Patent Literature 1: Japanese Patent Application Laid Open No. 2012-246850
Patent Literature 2: Japanese Patent Application Laid Open No. 2011-195075
Patent Literature 3: Japanese Patent Application Laid Open No. 2010-076596

SUMMARY OF INVENTION

Technical Problem

It is considered that the misfire caused by the retained EGR gas can be realized, for example, by reducing an EGR ratio (i.e. a ratio of the EGR gas to a fresh air) in deceleration and subsequent reacceleration. The control that simply reduces only the EGR ratio, however, also reduces the beneficial effect obtained by the recirculation of the EGR gas (e.g. the fuel efficiency improvement, etc.).

Moreover, the technology described in the Patent Literature 1 also requires the load torque control for absorbing the torque change caused by the scavenging control. Thus, even if the misfire can be suppressed, a process to perform in the vehicle becomes highly complicated, which is technically problematic.

The aforementioned problem is exemplified as one example of problems to be solved by the present invention. It is therefore an object of the present invention to provide a control apparatus for a hybrid vehicle that can preferably prevent the misfire of the internal combustion engine caused by the retained EGR gas.

Solution to Problem

The above object of the present invention can be achieved by a control apparatus for a hybrid vehicle, configured to control a hybrid vehicle, the hybrid vehicle including: a power source including an internal combustion engine and an electric motor; a recirculating device configured to recirculate an exhaust gas from an exhaust side to an intake side of the internal combustion engine; and a recirculation amount adjusting device configured to adjust an amount of the recirculation by the recirculating device; said control apparatus comprising: a determining device configured to determine whether or not the internal combustion engine is stopped and electric running can be performed by the electric motor if the hybrid vehicle runs while operating the internal combustion engine; and a recirculation controlling device configured to control the recirculation amount adjusting device such that the amount of the recirculation by the recirculating device is larger than an amount when it is determined that the electric running cannot be performed, if it is determined that the electric running can be performed.

The hybrid vehicle according to the present invention is a vehicle that is provided at least with: the internal combustion engine, which can adopt various aspects regardless of a fuel type, a fuel supply aspect, a fuel combustion aspect, an intake/exhaust system configuration, cylinder arrangement, or the like; and the electric motor, which can be configured as an electric motor generator, such as, for example, a motor generator, as the power source configured to supply power to a drive shaft.

Moreover, the hybrid vehicle according to the present invention is further provided with: the recirculating device configured to recirculate the exhaust gas from the exhaust side to the intake side of the internal combustion engine; and the recirculation amount adjusting device configured to adjust the amount of the recirculation by the recirculating device. For example, the recirculating device is configured as a recirculating pipe that connects an exhaust passage and an intake passage of the internal combustion engine, and the recirculation amount adjusting device is configured as an adjusting valve that controls opening/closing of the recirculating pipe. By performing the recirculation by the recirculating device, an effect of fuel efficiency improvement, exhaust emission improvement, or similar effects can be obtained.

The control apparatus for the hybrid vehicle according to the present invention is a control apparatus configured to control such a hybrid vehicle, and can adopt forms of various computer systems or the like, such as various controllers or microcomputer apparatuses, and various processing units like a single or a plurality of electronic control units (ECUs), which can include, if necessary, for example, one or a plurality of central processing units (CPUs), micro processing units (MPUs), various processors or various controllers, and various storing devices, such as a read only memory (ROM), a random access memory (RAM), a buffer memory, and a flash memory.

In operation of the control apparatus for the hybrid vehicle according to the present invention, it is firstly determined by the determining device whether or not the hybrid vehicle runs while operating the internal combustion engine. If it is determined that the hybrid vehicle runs while operating the internal combustion engine, it is further determined whether or not the internal combustion engine is stopped and the electric running by the electric motor can be performed. Whether or not the electric running can be performed can be determined, for example, on the basis of a state of charge (SOC) of a battery, a warm-up request to the internal combustion engine, or the like.

If the determination by the determining device is ended, the recirculation adjusting device is controlled by the recirculation controlling device, and the amount of the recirculation by the recirculating device is adjusted. Specifically, if it is determined that the electric running can be performed, the amount of the recirculation by the recirculating device is set to be larger than the amount when it is determined that the electric running cannot be performed. In other words, if it is determined that the electric running cannot be performed, the amount of the recirculation by the recirculating device is set to be smaller than an amount when it is determined that the electric running can be performed.

Here, if the adjustment of the amount of the recirculation described above is not performed, a constant amount of exhaust gas is recirculated by the recirculating device, regardless of whether or not the electric running of the hybrid vehicle can be performed. Then, even if the electric running cannot be performed (in other words, even if running with the internal combustion engine operated is maintained), a relatively large amount of exhaust gas is recirculated. In this case, due to retention of the exhaust gas that is recirculated into the intake passage when a deceleration operation is performed, a possibility of a misfire of the internal combustion engine increases. In particular, in deceleration of the hybrid vehicle, normally, a throttle valve opening degree is controlled to be on a closed side. This causes a situation in which the exhaust gas recirculated by the recirculating device is easily retained in the intake passage (i.e. in which the misfire easily occurs).

In the present invention, however, as described above, if it is determined that the electric running cannot be performed, the amount of the recirculation by the recirculating device is set to be relatively small. This reduces the amount of the retained exhaust gas, and can effectively suppress the misfire of the internal combustion engine. On the other hand, if it is determined that the electric running can be performed, the amount of the recirculation by the recirculating device is set to be relatively large. It is thus possible to sufficiently demonstrate the effect of fuel efficiency improvement or similar effects obtained by the recirculation by the recirculating device. Moreover, since it is determined that the electric running can be performed, there is no possibility of the misfire if the internal combustion engine is stopped to move into the electric running.

As explained above, according to the control apparatus for the hybrid vehicle of the present invention, it is possible to preferably prevent the misfire of the internal combustion engine caused by the retained exhaust gas that is recirculated.

In another aspect of the control apparatus for the hybrid vehicle according to the present invention, wherein said recirculation controlling device controls the recirculation amount adjusting device such that the amount of the recirculation by the recirculating device becomes larger as a difference becomes smaller between a present accelerator opening degree and an accelerator opening degree when the internal combustion engine is stopped.

According to this aspect, before the adjust of the amount of the recirculation by the recirculation amount adjusting device, the present accelerator opening degree and the accelerator opening degree when the internal combustion engine is stopped are compared, and a difference thereof is calculated. Here, the "present accelerator opening degree" means an accelerator opening degree of the hybrid vehicle that runs while operating the internal combustion engine. On the other hand, the "accelerator opening degree when the internal combustion engine is stopped" means an accelerator opening degree when the hybrid vehicle that runs while operating the internal combustion engine stops the internal combustion engine and performs the electric running. More specifically, it is an accelerator opening degree when the electric running is realized if it is determined by the determining device that the electric running can be performed.

If the difference is calculated between the present accelerator opening degree and the accelerator opening degree when the internal combustion engine is stopped, the amount of the recirculation by the recirculating device is adjusted according to the calculated difference. Specifically, the amount of the recirculation is set to be larger as the calculated difference is smaller. Thus, for example, if there is a small difference between the present accelerator opening degree and the accelerator opening degree when the internal combustion engine is stopped, the amount of the recirculation by the recirculating device is adjusted to be relatively large. On the other hand, if there is a large difference between the present accelerator opening degree and the accelerator opening degree when the internal combustion engine is stopped, the amount of the recirculation by the recirculating device is adjusted to be relatively small.

Here, when the difference between the present accelerator opening degree and the accelerator opening degree when the internal combustion engine is stopped (hereinafter referred to as an "accelerator returning width" as occasion demands) is large, a driving force is significantly reduced to cause a driving force difference if the misfire occurs in the internal combustion engine. The driving force difference deteriorates drivability. On the other hand, if the accelerator returning width is narrow, a reduction width of the driving force is narrow even if the misfire occurs. Thus, the driving force difference generated is also small, and the deterioration of the drivability is relatively less.

Therefore, if the amount of the recirculation is adjusted according to the accelerator returning width as' in this aspect, it is possible to efficiently prevent the misfire while suppressing the deterioration of the drivability.

In another aspect of the control apparatus for the hybrid vehicle according to the present invention, further comprising a motoring control device configured to control the electric motor to perform motoring of the internal combustion engine during the electric running.

According to this aspect, the scavenging of the recirculated exhaust gas by the motoring can be performed even during the electric running in which the internal combustion engine is stopped. This makes it possible to suppress the misfire at a restart of the internal combustion engine.

The operation and other advantages of the present invention will become more apparent from embodiments explained below.

BRIEF DESCRIPTION OF DRAWINGS

FIG. 2 is a table of actuation and engagement for the hybrid vehicle according to the first embodiment.

FIG. 14 is a time chart illustrating parameter variations in operation of the control apparatus for the hybrid vehicle according to the reference example.

DESCRIPTION OF EMBODIMENTS

Hereinafter, a control apparatus for a hybrid vehicle according to embodiments will be explained.

(1) First Embodiment

Firstly, with reference to FIG. 1 to FIG. 10, a first embodiment will be explained.

(1-1) Entire Configuration of Hybrid Vehicle According to First Embodiment

Figure 1:
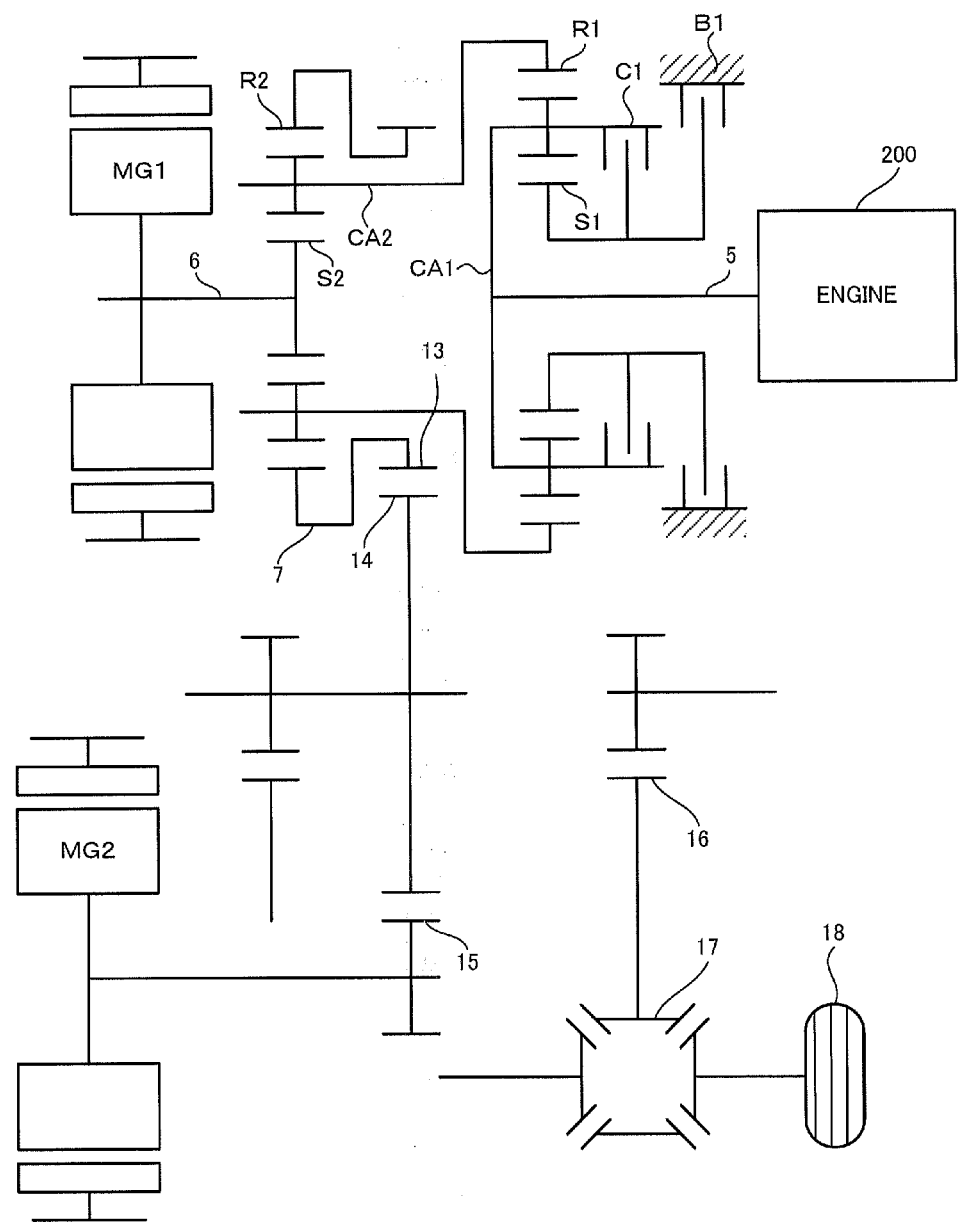
FIG. 1 is a skeleton diagram illustrating an entire configuration of a hybrid vehicle according to a first embodiment.

Firstly, with reference to FIG. 1, an entire configuration of a hybrid vehicle 1 according to the first embodiment will be explained. FIG. 1 is a skeleton diagram illustrating the entire configuration of the hybrid vehicle according to the first embodiment.

As illustrated in FIG. 1, a hybrid vehicle 1 according to the embodiment is configured as a hybrid vehicle having a plurality of power sources combined. Specifically, the hybrid vehicle 1 is provided with an engine 200, a motor generator MG1, and a motor generator MG2, as a power source for running.

The engine 200 is a gasoline engine, which functions as a main power source of the hybrid vehicle 1 and which is one example of the "internal combustion engine" according to the present invention.

Each of the motor generators MG1 and MG2 is an electric motor generator, which has a power running function for converting electrical energy to kinetic energy and a regeneration function for converting kinetic energy to electrical energy, and which is one example of the "rotary electric machine" according to the present invention. Each of the motor generators MG1 and MG2 is configured as an electric motor generator that is provided, for example, with a rotor having a plurality of permanent magnets on an outer circumferential surface, and a stator around which a three-phase coil for forming a rotating magnetic field is wound. Of course, the motor generators MG1 and MG2 may have another configuration.

An engine output shaft 5, which is an output shaft of the engine 200, is coupled with a single pinion type planetary gear mechanism, which functions as a transmission mechanism. The planetary gear mechanism has a sun gear S1 as an outer gear; a ring gear R1 as an inner gear arranged coaxially with the sun gear S1; and a carrier CA1 holding pinions, which engage with the sun gear S1 and the ring gear R1, so as to rotate and revolve. The engine output shaft 5 is coupled with the carrier CA1, and the engine output shaft 5 rotates integrally with the carrier CA1. Thus, engine torque outputted by the engine 200 is transmitted to the carrier CA1.

A clutch C1 and a brake 111 are coupled with the sun gear S1 of the planetary gear mechanism. If the clutch C1 is engaged, the sun gear S1 and the carrier CA1 integrally rotate. If the brake B1 is engaged, the rotation of the sun gear S1 is fixed. The hybrid vehicle 1 can change a drive state by controlling an engagement state of the clutch C1 and the brake B1. Each running mode realized by controlling the engagement state of the clutch C1 and the brake B1 will be described iii detail later.

The ring gear R1 is coupled with a carrier CA2 of another planetary gear mechanism, which functions as an actuating mechanism. The carrier CA2 constitutes the planetary gear mechanism with a sun gear S2 and a ring gear R2. A MG rotating shaft 6, which is a rotating shaft of the motor generator MG1, is coupled with the sun gear S2. The ring gear R2 is coupled with a drive shaft 7, and the drive shaft 7 is coupled with a drive gear 13. Thus, the drive gear 13 rotates integrally with the ring gear R2, and torque outputted via the ring gear R2 is transmitted to the drive gear 13.

The drive gear 13 engages with a driven gear 14. The driven gear 14 is coupled with the rotor of the motor generator MG2 via a gear 15. The gear 15 rotates integrally with the rotor of the motor generator MG2. Moreover, torque outputted from the driven gear 14 is transmitted to a differential apparatus 17 via a gear 16, and is distributed to left and right drive wheels 18 via the differential apparatus 17.

(1-2) Running Modes of Hybrid Vehicle According to First Embodiment

Figure 3:
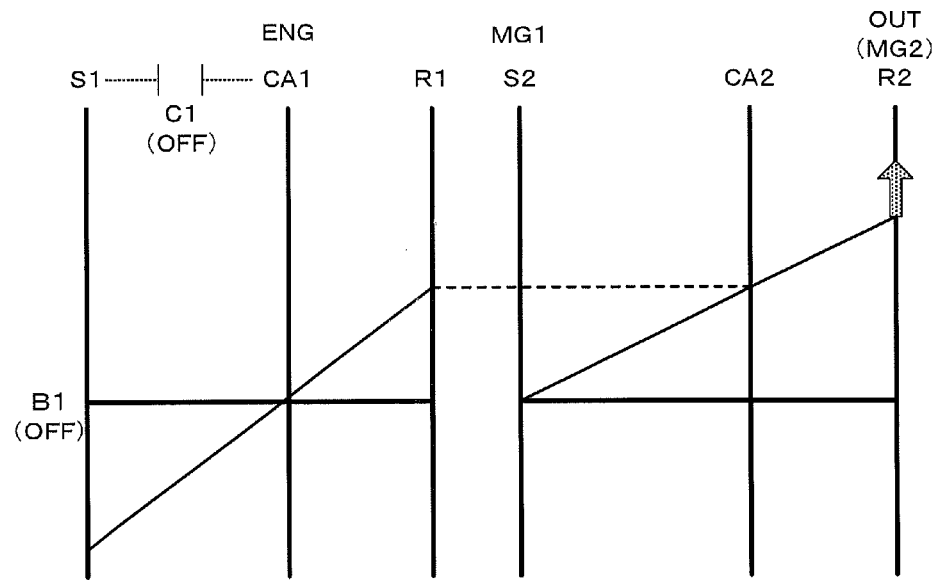
FIG. 3 is a collinear figure in single motor running of the hybrid vehicle according to the first embodiment.
Figure 4:
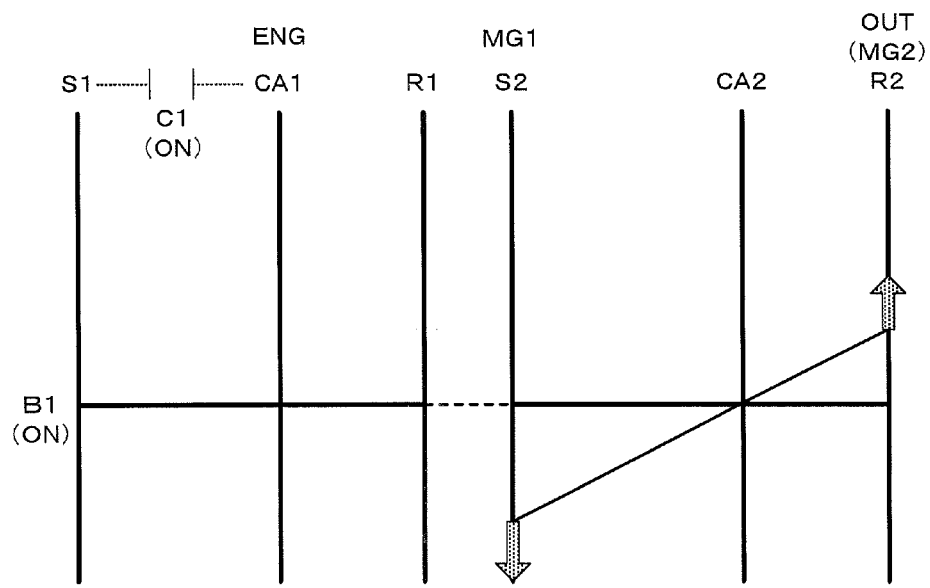
FIG. 4 is a collinear figure in double motor running of the hybrid vehicle according to the first embodiment.
Figure 5:
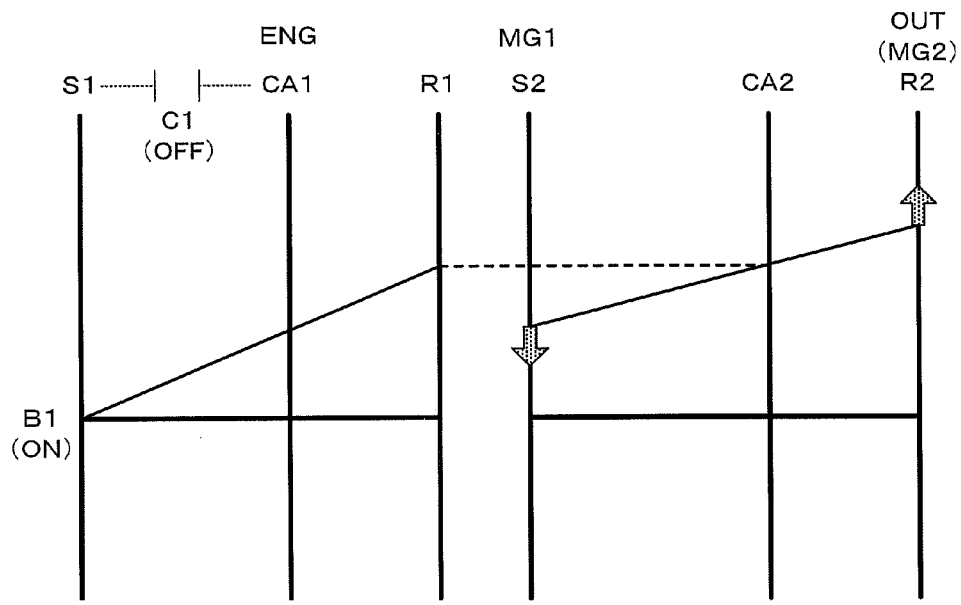
FIG. 5 is a collinear figure in HV running of the hybrid vehicle according to the first embodiment.
Figure 6:
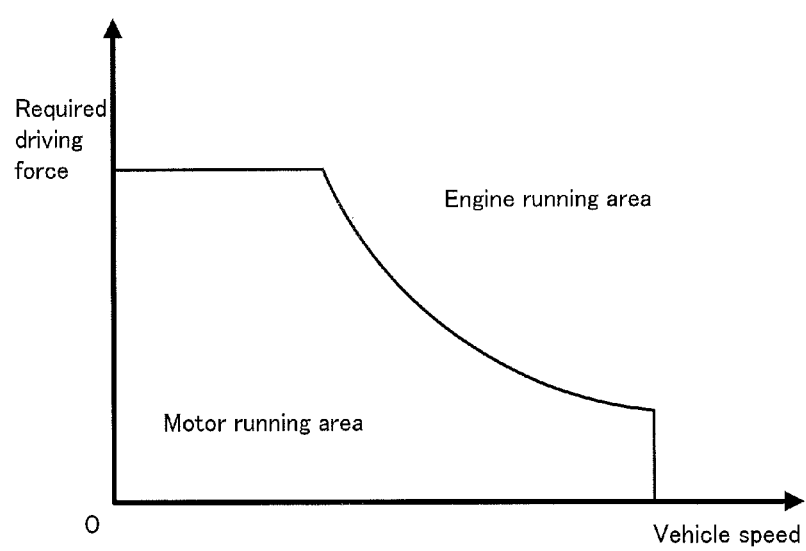
FIG. 6 is a map illustrating a drive area of the hybrid vehicle according to the first embodiment.

Next, running modes realized in the hybrid vehicle 1 according to the first embodiment will be explained with reference to FIG. 2 to FIG. 6. FIG. 2 is a table of actuation and engagement for the hybrid vehicle according to the first embodiment. FIG. 3 is a collinear figure in single motor running of the hybrid vehicle according to the first embodiment. FIG. 4 is a collinear figure in double motor running of the hybrid vehicle according to the first embodiment. FIG. 5 is a collinear figure in HV running of the hybrid vehicle according to the first embodiment. FIG. 6 is a map illustrating a driving area of the hybrid vehicle according to the first embodiment.

As illustrated in FIG. 2, each of the running modes of the hybrid vehicle 1 is determined depending on the engagement state of the clutch C1 and the brake B1 of the hybrid vehicle 1 (refer to FIG. 1) and how to function the motor generators MG1 and MG2.

Specifically, single motor drive in an EV mode (i.e. a motor running mode) is realized by setting the motor generator MG1 to function mainly as a generator (corresponding to "G" in FIG. 2) and by setting the motor generator MG2 to function mainly as a motor (or a generator during regeneration) (corresponding to "M" in FIG. 2), without engaging any of the clutch C1 and the brake B1. If an engine brake is used together, any of the clutch C1 and the brake B1 is engaged (corresponding to a triangle in FIG. 2).

As illustrated in FIG. 3, in the single motor drive in the EV mode, the number of revolutions of the engine 200 and the number of revolutions of the MG1 are set to be zero, and torque is outputted only from the motor generator MG2.

Back in FIG. 2, dual motor drive in the EV mode is realized by setting both the motor generators MG1 and MG2 to function mainly as motors, with engaging both the clutch C1 and the brake B1 (corresponding to a circle in FIG. 2).

As illustrated in FIG. 4, in the dual motor drive in the EV mode, the number of revolutions of the sun gear S1, the number of revolutions of the carrier CA1, and the number of revolutions of the ring gear R1 are set to be zero, and torque is outputted from both the motor generators MG1 and MG2.

Back in FIG. 2, high transmission ratio drive in an HV mode (i.e. an engine running mode) is realized by setting the motor generator MG1 to function mainly as a generator and by setting the motor generator MG2 to function mainly as a motor, without engaging the clutch C1 but with engaging the brake B1.

Moreover, low transmission, ratio drive in the HV mode is realized by setting the motor generator MG to function mainly as a generator and by setting the motor generator MG2 to function mainly as a motor, with engaging the clutch C1 but without engaging the brake B1.

As illustrated in FIG. 5, in high transmission ratio drive in the HV mode, running is performed with direct torque of the engine 200 and torque of the motor MG2, while the motor generator MG1 takes a reaction force of the engine 200.

In FIG. 6, the EV mode and the HV mode described above are determined according to a vehicle speed and a required driving force of the hybrid vehicle 1. Specifically, the EV mode is selected in a state of a relatively low vehicle speed and a relatively low required driving force, and the HV mode is selected in a state of a relatively high vehicle speed and a relatively high required driving force. The map illustrated in FIG. 6 indicates a normal case. For example, in warm-up of the engine 200 and in SOC reduction, there is no motor running area (i.e. motor running cannot be performed).

(1-3) Engine Configuration of Hybrid Vehicle According to First Embodiment

Figure 7:
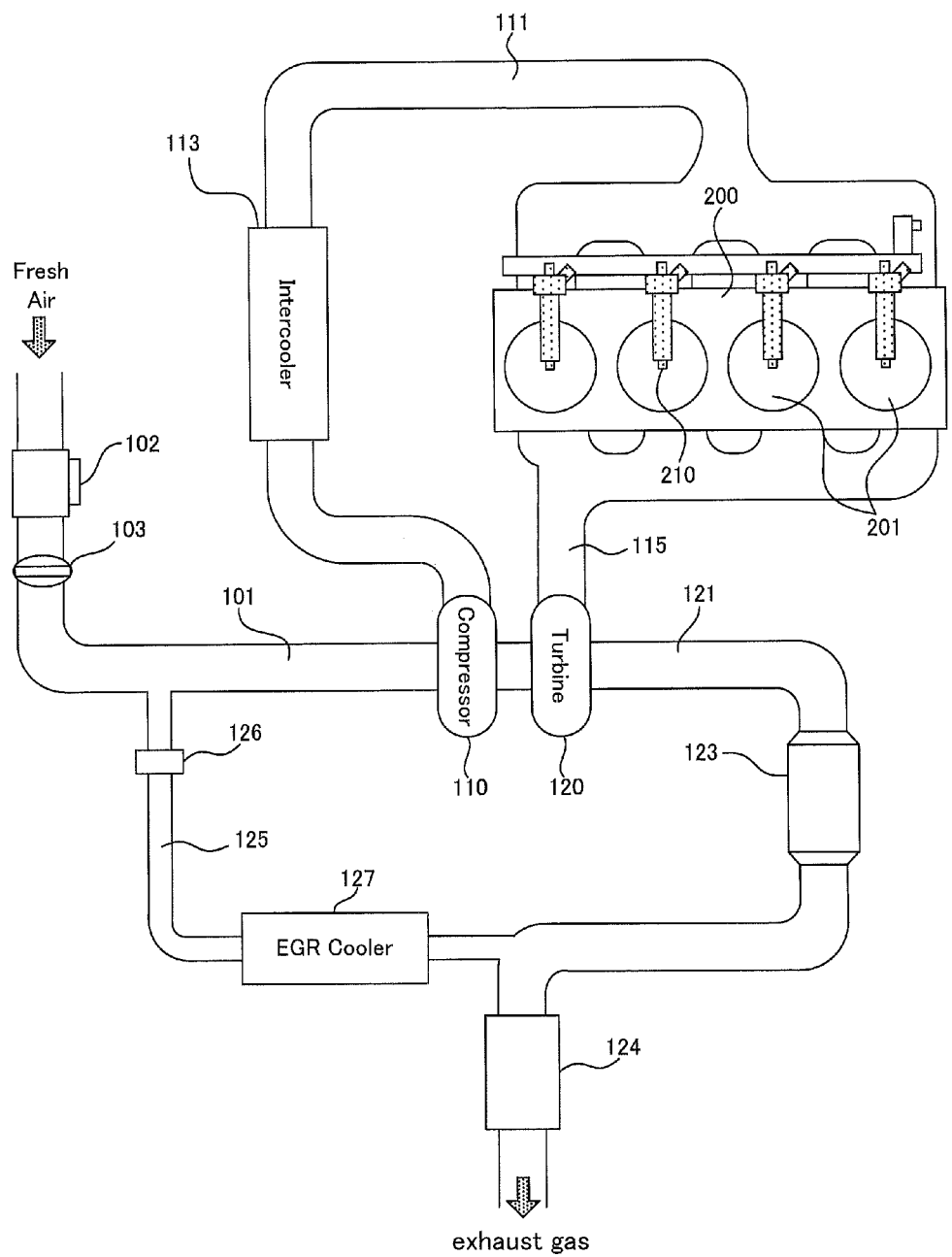
FIG. 7 is a schematic diagram illustrating a configuration of an internal combustion engine of the hybrid vehicle according to the first embodiment.

Next, a configuration of surroundings of the engine 200 of the hybrid vehicle 1 according to the first embodiment will be explained with reference to FIG. 7. FIG. 7 is a schematic diagram illustrating a configuration of an internal combustion engine of the hybrid vehicle according to the first embodiment.

In FIG. 7, the engine 200 according to the embodiment is configured as a supercharging engine, which is provided with a compressor 110 and a turbine 120.

The compressor 110 compresses an inflow air and supplies it downstream as a compressed air. The turbine 120 rotates by using, as power, an exhaust air supplied from the engine 200 via an exhaust pipe 115. The turbine 120 is coupled with the compressor 110 via a shaft and is configured to rotate integrally with the compressor 110. In other words, the turbine 120 and the compressor 110 constitute a turbocharger.

The engine 200 is, for example, an in-line four-cylinder engine in which four cylinders 201 are arranged in line in a cylinder block. Detailed illustration is omitted herein, but the engine 200 is configured to convert reciprocating motion of a piston generated when an air-fuel mixture is burned inside each of the cylinders 201, to rotational motion of a crankshaft via a connecting rod.

In an intake pipe 101 on an inlet side of the compressor 110, i.e. on an upstream side of the compressor 110, an airflow meter 102 is provided. The airflow meter 102 is configured to detect the amount of an air sucked from the exterior. At a later stage of the airflow meter 102, an intake throttle valve 103 is provided. The intake throttle valve 103 is, for example, an electronic control valve, and is configured in such a manner that an opening/closing operation of the intake throttle valve 103 is controlled by a not-illustrated throttle valve motor. The amount of the air that flows in the intake pipe 101 is adjusted by the opening/closing operation of the intake throttle valve 103.

In an intake pipe 111 on an outlet side of the compressor 110, i.e. on a downstream side of the compressor 110, and on an intake side of the engine 200, i.e. on a downstream side of the cylinders 201, an intercooler 113 is provided. The intercooler 113 is configured to cool an intake air and to increase supercharging efficiency of the air.

In combustion chambers inside the cylinders 201 of the engine 200, the air-fuel mixture is sucked, wherein the air-fuel mixture is obtained by mixing an air supplied via the intake pipe 111 and fuel injected from an injector 210. The air-fuel mixture led into each of the cylinders 201 from the intake side is ignited by respective one of spark plugs or the like, which are not illustrated, and an explosive stroke is performed in each of the cylinders 201. If the explosive stroke is performed, the burned air-fuel mixture (containing the air-fuel mixture partially unburned) is emitted to each of exhaust ports, which are not illustrated, in an exhaust stroke following the explosive stroke. An exhaust gas emitted to the exhaust port is led to the exhaust pipe 115.

In an exhaust pipe 121 on an outlet side of the turbine 120, i.e. on a downstream side of the turbine 120, there is provided an EGR system, which is provided with a start converter 123, a post-processing apparatus 124, an EGR pipe 125, an EGR valve 126, and an EGR cooler 127.

The start converter 123 contains, for example, an oxidation catalyst, and purifies a material contained in the exhaust gas that passes through the turbine 120.

The post-processing apparatus 124 is provided on a downstream side of the start converter 123 of the exhaust pipe 122, and collects and reduces particulates contained in the exhaust gas.

The EGR pipe 125 is one example of the "recirculating device" according to the present invention, and is configured to recirculate the exhaust gas on the downstream side of the start converter 123, to the intake pipe 101 on the inlet side of the compressor 110. The EGR valve 126, which is one example of the "recirculation amount adjusting device" according to the present invention, is provided on the EGR pipe 125, and can adjust the amount of an EGR gas. The EGR cooler 127 configured to cool the EGR gas to be recirculated is provided on the EGR pipe 125.

Figure 8:
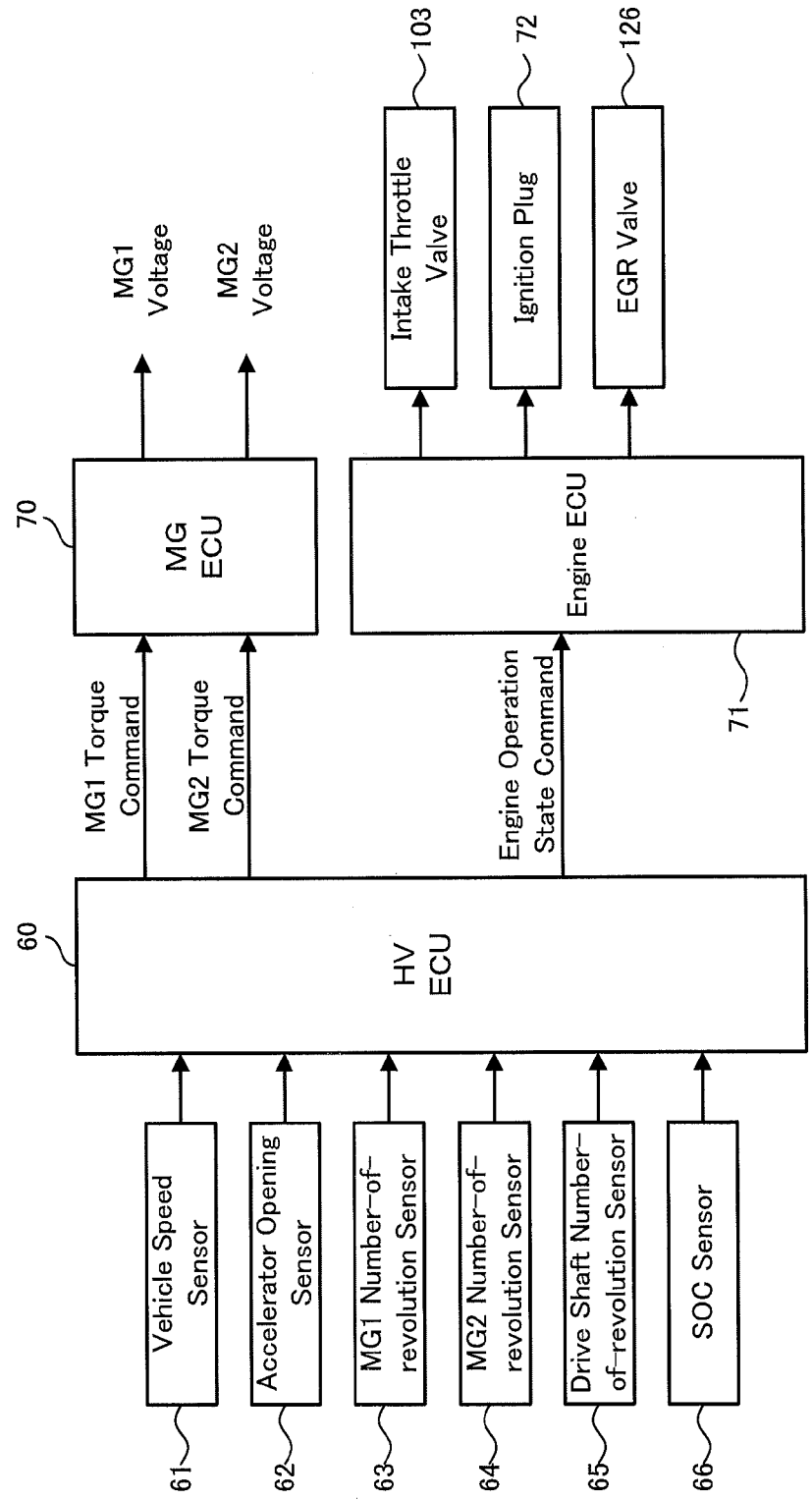
FIG. 8 is a block diagram illustrating a control system of a control apparatus for the hybrid vehicle according to the first embodiment.

(1-4) Configuration of Control Apparatus for Hybrid Vehicle According to First Embodiment Next, a configuration of a control apparatus for the hybrid vehicle according to the first embodiment will be explained with reference to FIG. 8. FIG. 8 is a block diagram illustrating a control system of the control apparatus for the hybrid vehicle according to the first embodiment.

As illustrated in FIG. 8, each part of the hybrid vehicle 1 according to the embodiment is controlled on various electronic control units (ECUs).

Output signals are inputted into a hybrid ECU 60, wherein the output signals are outputted from a vehicle sensor 61 configured to output a signal according to the vehicle speed of the vehicle 1, an accelerator opening sensor configured to output a signal according to a stepping amount of an accelerator pedal, a MG1 number-of-revolutions sensor 63 configured to output a signal according to a rotational speed of the motor generator MG1, a MG2 number-of-revolutions sensor 64 configured to output a signal according to a rotational speed of the motor generator MG2, a drive shaft number-of-revolutions sensor 65 configured to output a signal according to a rotational speed of the drive shaft 7, a SOC sensor configured to output a signal according to a charge amount of a not-illustrated battery, and the like.

The hybrid ECU 60 calculates torque to be generated by the motor generators MG1 and MG2, and outputs a command to a MGECU 70 regarding the torque to be generated. Moreover, the hybrid ECU 60 determines an operating condition of the engine 200, and outputs a command to an engine ECU 71 regarding the operating condition of the engine 200.

The MGECU 70 calculates voltage corresponding to the torque to be generated by the motor generators MG1 and MG2, and outputs the voltage to each of the motor generators MG1 and MG2.

The engine ECU 71 performs various controls on the intake throttle valve 103, the ignition plug 72, the EGR valve 126 and the like, on the basis of the command inputted from the hybrid ECU 60.

Figure 9:
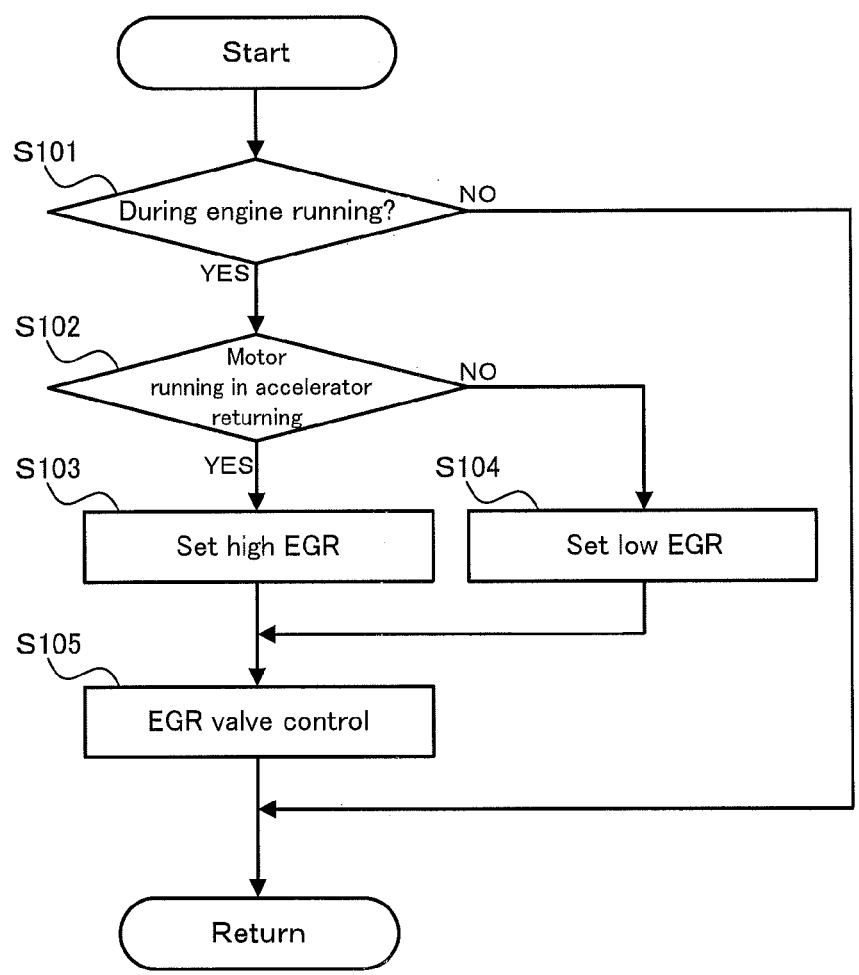
FIG. 9 is a flowchart illustrating operations of the control apparatus for the hybrid vehicle according to the first embodiment.

(1-5) Operations of Control Apparatus for Hybrid Vehicle According to First Embodiment Next, operations of the control apparatus for the hybrid vehicle according to the first embodiment will be explained with reference to FIG. 9. FIG. 9 is a flowchart illustrating the operations of the control apparatus for the hybrid vehicle according to the first embodiment.

In FIG. 9, if an operation of the control apparatus for the hybrid vehicle according to the embodiment is started, it is firstly determined on the hybrid ECU 60 whether or not the hybrid vehicle 1 is performing engine running (i.e. running in the HV mode) (step S101). In other words, it is determined whether or not the engine 200 is operating. If it is determined that the hybrid vehicle 1 is not performing the engine running (step S101: NO), the subsequent process is omitted. In other words, if the hybrid vehicle 1 is performing the motor running (or running in the EV mode) at a control start time point, the hybrid vehicle is excluded from a control target.

On the other hand, if it is determined that the hybrid vehicle 1 is performing the engine running (step S101: YES), it is determined whether or not the hybrid vehicle 1 performs the motor running when an accelerator opening degree is returned to a fully closed position (step S102). In other words, if it is required to reduce the speed, it is determined whether or not the operation of the engine 200 is stopped and the running only with the motor generators MG1 and MG2 is performed. Whether or not the hybrid vehicle 1 performs the running motor can be determined on condition of whether or not a SOC increases enough to perform the motor running, or of whether or not the engine 200 is warmed up. In other words, it can be determined from whether or not the motor running area appears in the map illustrated in FIG. 6.

In the determination in the step S102 described above, it may be determined whether or not electric running is performed if the hybrid vehicle 1 is decelerated on an assumption that the hybrid vehicle 1 is decelerated in a future. More specifically, not only in steady running, but also on a premise that the hybrid vehicle 1 in acceleration is decelerated after accelerated, it may be determined whether or not the hybrid vehicle after decelerated can run after the running is changed to the motor running Here, if it is determined that the hybrid vehicle 1 performs the motor running in accelerator returning (i.e. in deceleration) (the step S102: YES), an EGR ratio by the EGR system (specifically, mass of the exhaust gas to be recirculated/mass of a fresh air intake gas) is set to be high (step S103). On the other hand, if it is determined that the hybrid vehicle 1 does not perform the motor running in accelerator returning (the step S102: NO), the EGR ratio by the EGR system is set to be low (step S104).

If the EGR ratio is set, an opening degree of the EGR valve is controlled by the engine ECU 71 in order to realize the set EGR ratio (step S105). Specifically, if the EGR ratio is set to be high, the opening degree of the EGR valve 126 is controlled to be large. On the other hand, if the EGR ratio is set to be low, the opening degree of the EGR valve 126 is controlled to be small. If the opening degree of the EGR valve 126 is an opening degree according to the already set EGR ratio, the opening degree may not be controlled again.

According to a series of process operations described above, the EGR ratio is changed according to whether or not the hybrid vehicle 1 performs the motor running in deceleration. Here, if the adjustment of the EGR ratio described above is not performed, a constant amount of exhaust gas is recirculated from the EGR system, regardless of whether or not the hybrid vehicle performs the motor running. Then, even if the hybrid vehicle 1 continues to perform the engine running, a relatively large amount of exhaust gas is recirculated, and that increases a possibility that the EGR gas is retained in the intake pipes 110 and 111, or the like. In particular, in deceleration of the hybrid vehicle 1, the intake throttle valve 103 is controlled to be on a closed side, which easily causes retention of the EGR gas. Moreover, in the engine 200 having a supercharger as in the embodiment, the intake pipes 110 and 111 are relatively long, which easily causes the retention of the EGR gas. The retention of the EGR gas in the intake pipes 110 and 111 as described above causes a misfire of the engine 200.

In contrast, in the embodiment, as described above, if the hybrid vehicle 1 does not perform the motor running (i.e. if the engine running is continued), the EGR ratio is set to be low. This reduces the amount of the retained EGR gas and makes it possible to effectively suppress the misfire of the engine 200. In other words, the EGR ratio set in the step S104 may be set as a value that does not to allow the generation of the retained EGR gas enough to cause the misfire (i.e. that is enough to scavenge the EGR gas).

On the other hand, if it is determined that the hybrid vehicle 1 performs the motor running, the EGR ratio is set to be high. It is thus possible to sufficiently demonstrate the effect of fuel efficiency improvement or similar effects obtained by the exhaust gas recirculation in the EGR system. Moreover, since the hybrid vehicle 1 in this case performs the motor running due to deceleration (i.e. the engine 200 is stopped), the retention of the EGR gas does not likely cause the misfire.

Figure 10:
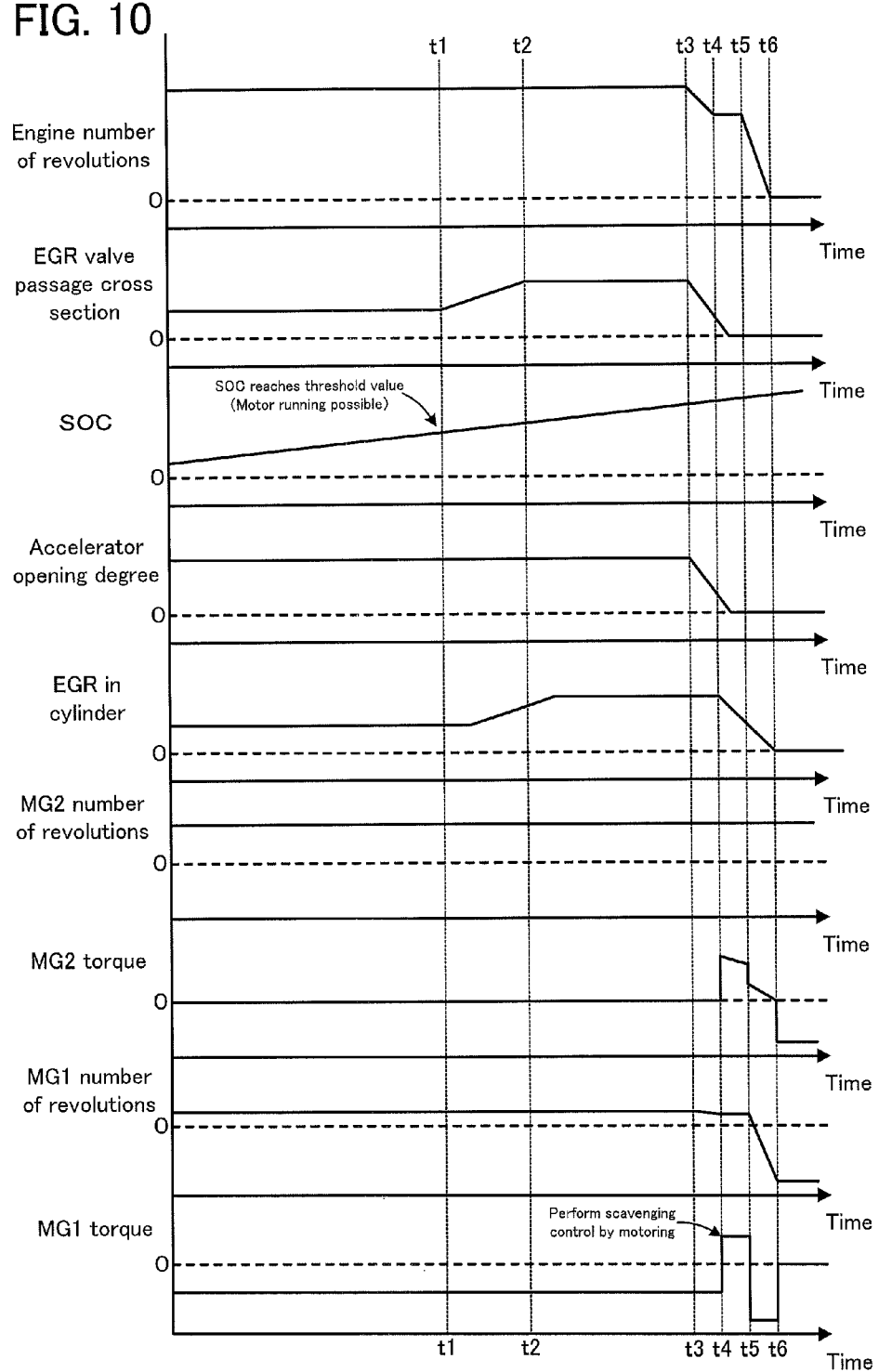
FIG. 10 is a time chart illustrating parameter variations in operation of the control apparatus for the hybrid vehicle according to the first embodiment.

(1-6) Control Example by Control Apparatus for Hybrid Vehicle According to First Embodiment Next, a specific control example by the control apparatus for the hybrid vehicle according to the first embodiment will be explained with reference to FIG. 10. FIG. 10 is a time chart illustrating parameter variations in operation of the control apparatus for the hybrid vehicle according to the first embodiment.

In FIG. 10, it is assumed that the hybrid vehicle 1 sets a constant accelerator opening degree and performs the engine running. The hybrid vehicle 1 is determined not to be able to perform the motor running at an initial stage because the SOC does not reach a predetermined threshold value. Thus, a passage cross section (opening degree) of the EGR valve 126 is set to be relatively low.

On the other hand, in the hybrid vehicle 1, power generation is performed due to regeneration by the motor generator MG1. Thus, a battery SOC increases over time, and reaches the predetermined threshold value at a time point t1. It is thus determined that the motor running can be performed after the time point t1, and control is performed to increase the passage cross section of the EGR valve 126 between the time point t1 and a time point t2. The amount of the actual EGR gas in the cylinder increases with a delay from the control of the EGR valve 126.

Then, accelerator returning occurs at a time point t3. Thus, after the time point t3, control is performed to reduce the passage cross section of the EGR valve 126. Moreover, due to a further reduction in the accelerator opening degree, stop control of the engine 200 is started at a time point t4, and the stop control of the engine 200 is completed at a time point t5.

During the stop control of the engine 200, motoring of the engine 200 is performed by the motor generator MG1, which accelerates the scavenging of the retained EGR gas. At this time, vehicle deceleration occurs in association with the motoring, and thus, torque is compensated by the motor generator MG2. Between the time point t5 and a time point t6, the number of revolutions of the engine 200 is reduced, and thus, negative torque increases on the motor generator MG1. After the time point t6, regeneration by the motor generator MG2 is performed.

In the aforementioned process, the EGR gas in the cylinder is reduced with a delay from the time point t3 at which the accelerator opening degree starts to be reduced. At the time point t5, however, the engine stop control is completed (i.e. the motor running is started). Thus, there is no possibility of the misfire of the engine 200.

As explained above, according to the control apparatus for the hybrid vehicle in the first embodiment, it is possible to preferably prevent the misfire of the engine 200 caused by the retained EGR gas.

(2) Second Embodiment

Next, a control apparatus for a hybrid vehicle according to a second embodiment will be explained with reference to FIG. 11 and FIG. 12. The second embodiment is different from the first embodiment only in a partial operation, and is substantially the same as the first embodiment regarding other operations and the apparatus configuration. Thus, hereinafter, the different part from the first embodiment will be explained in detail, and an explanation of the same part will be omitted, as occasion demands.

(2-1) Operations of Control Apparatus for Hybrid Vehicle According to Second Embodiment Next, operations of the control apparatus for the hybrid vehicle according to the second embodiment will be explained with reference to FIG. 11. FIG. 11 is a flowchart illustrating the operations of the control apparatus for the hybrid vehicle according to the second embodiment.

Figure 11:
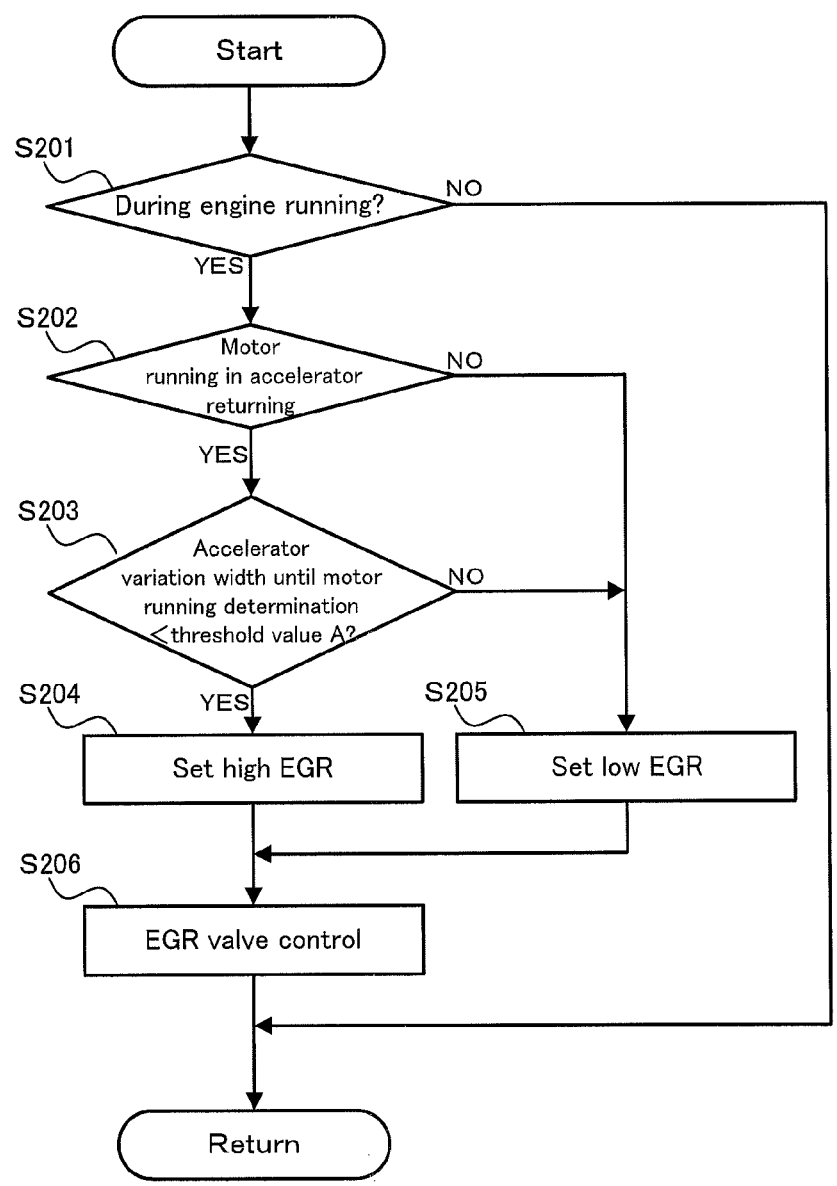
FIG. 11 is a flowchart illustrating operations of a control apparatus for a hybrid vehicle according to a second embodiment.

In FIG. 11, if an operation of the control apparatus for the hybrid vehicle according to the second embodiment is started, it is firstly determined on the hybrid ECU 60 whether or not the hybrid vehicle 1 is performing the engine running (i.e. the running in the HV mode) (step S201). If it is determined that the hybrid vehicle 1 is performing the engine running (step S201: YES), it is determined whether or not the hybrid vehicle 1 performs the motor running when the accelerator opening degree is returned to the fully closed position (step S202). In other words, the same processes as in the step S101 and the step S102 in the first embodiment are performed (refer to FIG. 9). If it is determined that the hybrid vehicle 1 does not perform the motor running in accelerator returning (the step S202: NO), the EGR ratio by the EGR system is set to be low, as in the first embodiment (step S205).

On the other hand, if it is determined that the hybrid vehicle 1 performs the motor running in accelerator returning (the step S202: YES), it is determined whether or not an accelerator variation width until the motor running determination is less than a predetermined threshold value A (step S203). Specifically, it is determined whether or not a difference between a present accelerator opening degree and an accelerator opening degree when the motor running is started (i.e. when the engine 200 is stopped) is less than the threshold value A. The threshold value A is a threshold value for determining magnitude of the accelerator variation width, and may be set according to magnitude of a driving force difference described later or the like.

Here, if it is determined that the accelerator variation width until the motor running determination is less than the predetermined threshold value A (the step S203: YES), the EGR ratio by the EGR system is set to be high (step S204). On the other hand, if it is determined that the accelerator variation width until the motor running determination is greater than or equal to the predetermined threshold value A (the step S203: NO), the EGR ratio by the EGR system is set to below (step S205). If the EGR ratio is set, the opening degree of the EGR valve 126 is controlled by the engine ECU 71 in order to realize the set EGR ratio (step S206).

According to a series of process operations described above, the EGR ratio is changed according to the accelerator variation width until the motor running determination, in addition to whether or not the hybrid vehicle 1 performs the motor running in deceleration. Here, if the accelerator variation width is wide, when the misfire occurs in the engine 200, the driving force is significantly reduced, which causes the driving force difference. The driving force difference deteriorates drivability. On the other hand, if the accelerator variation width is narrow, a driving force reduction width is narrow even if the misfire occurs in the engine 200. Thus, the driving force difference that occurs is also small, and the drivability is relatively less deteriorated.

Therefore, as in the embodiment, if the EGR ratio is adjusted according to the accelerator variation width until the motor running determination, it is possible to efficiently prevent the misfire while suppressing the deterioration of the drivability. In the embodiment, two types of EGR ratios are selectively set on the basis of a magnitude correlation between the accelerator variation width and the threshold value A; however, the EGR ratio may be also set linearly on the basis of the magnitude of the accelerator variation width.

(2-2) Control Example by Control Apparatus for Hybrid Vehicle According to Second Embodiment Next, a specific control example by the control apparatus for the hybrid vehicle according to the second embodiment will be explained with reference to FIG. 12. FIG. 12 is a time chart illustrating parameter variations in operation of the control apparatus for the hybrid vehicle according to the second embodiment.

Figure 12:
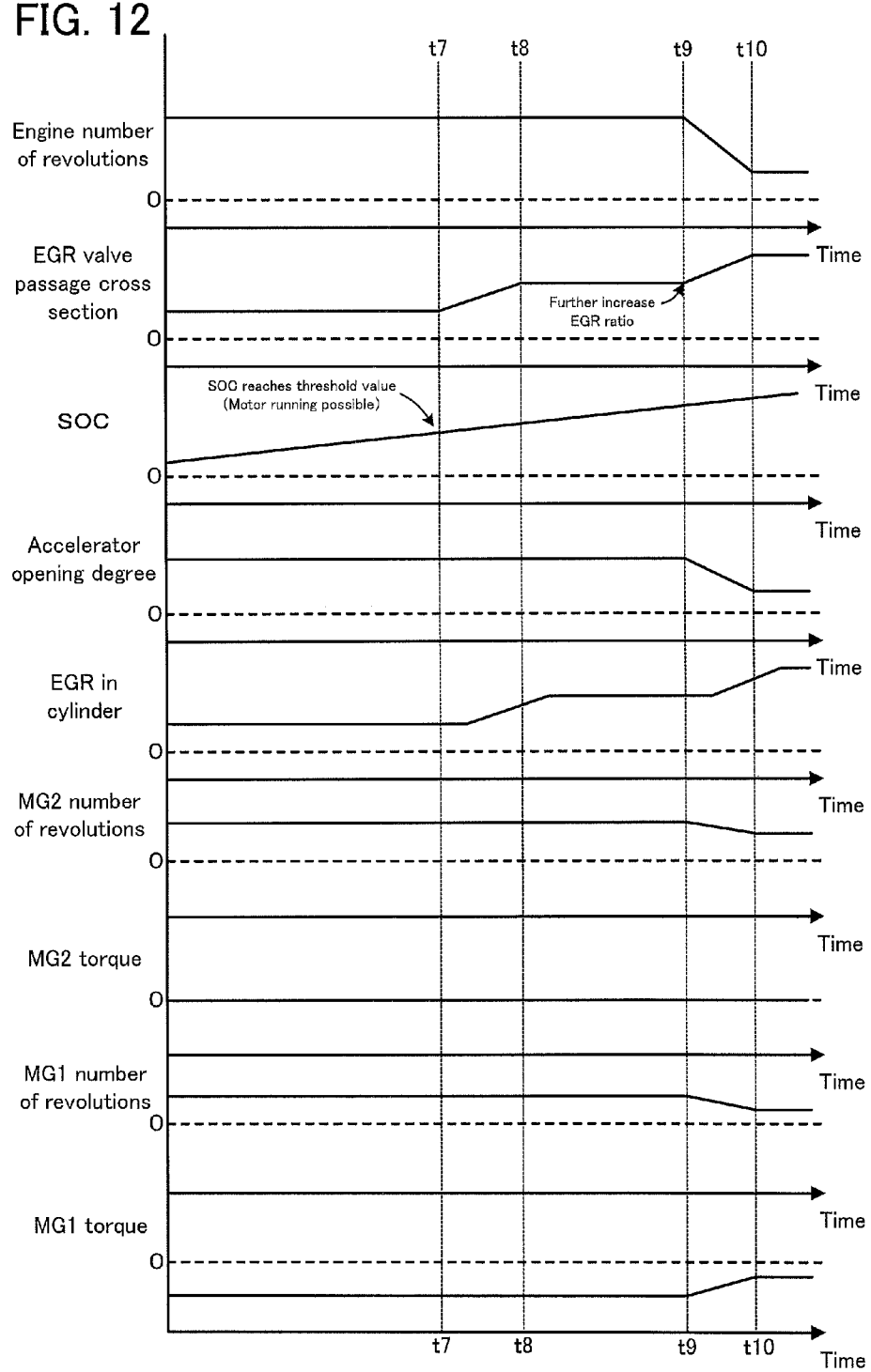
FIG. 12 is a time chart illustrating parameter variations in operation of the control apparatus for the hybrid vehicle according to the second embodiment.

In FIG. 12, it is assumed that the hybrid vehicle 1 sets a constant accelerator opening degree and performs the engine running. The hybrid vehicle 1 is determined not to be able to perform the motor running at an initial stage because the SOC does not reach a predetermined threshold value. Thus, a passage cross section of the EGR valve 126 is set to be relatively low.

On the other hand, in the hybrid vehicle 1, the power generation is performed due to the regeneration by the motor generator MG1. Thus, the battery SOC increases over time, and reaches the predetermined threshold value at a time point t7. It is thus determined that the motor running can be performed after the time point t7, and control is performed to increase the passage cross section of the EGR valve 126 between the time point t7 and a time point t8. The amount of the actual EGR gas in the cylinder increases with a delay from the control of the EGR valve 126.

Then, accelerator returning occurs at a time point t9. Here, in particular, at the time point t9, the accelerator opening degree is reduced by an accelerator returning operation, and it is determined that the accelerator variation width is extremely narrow on the basis of the fact that the accelerator variation width becomes less than the threshold value A. Thus, the driving force difference is determined to be small even if the misfire occurs, and in order to further increase the EGR ratio, control is performed to further increase the passage cross section of the EGR valve 126 from the time point t9 to a time point t10. It is thus possible to sufficiently demonstrate the effect of fuel efficiency improvement or similar effects obtained by the recirculation of the EGR gas.

The control of further increasing the EGR ratio according to the variation width of the accelerator opening degree as described above is one example of the control illustrated in the flowchart in FIG. 11, and is a control example when the setting of the EGR ratio illustrated in FIG. 11 is changed to be performed in more steps. In this case, if the accelerator variation width is wide at the time point t9, control may be performed to reduce the passage cross section of the EGR valve 126 from the time point t9 to the time point t10 in order to reduce the EGR ratio. Moreover, if it is determined that the accelerator variation width is intermediate at the time point t9, the passage cross section of the EGR valve 126 may be not changed so that a present EGR ratio can be maintained.

As explained above, according to the control apparatus for the hybrid vehicle in the second embodiment, the EGR ratio is set according to the magnitude of the driving force difference that can occur due to the misfire, and it is thus possible to preferably prevent the misfire while suppressing the deterioration of the drivability.

(3) Reference Example

Next, a control apparatus for a hybrid vehicle according to a reference example will be explained with reference to FIG. 13 and FIG. 14. The reference example is different from the first and second embodiments only in a partial operation, and is substantially the same as the first and second embodiments regarding other operations and the apparatus configuration. Thus, hereinafter, the different part from the first and second embodiments will be explained in detail, and an explanation of the same part will be omitted, as occasion demands.

(3-1) Operations of Control Apparatus for Hybrid Vehicle According to Reference Example Firstly, operations of the control apparatus for the hybrid vehicle according to the reference example will be explained with reference to FIG. 13. FIG. 13 is a flowchart illustrating the operations of the control apparatus for the hybrid vehicle according to the reference example.

Figure 13:
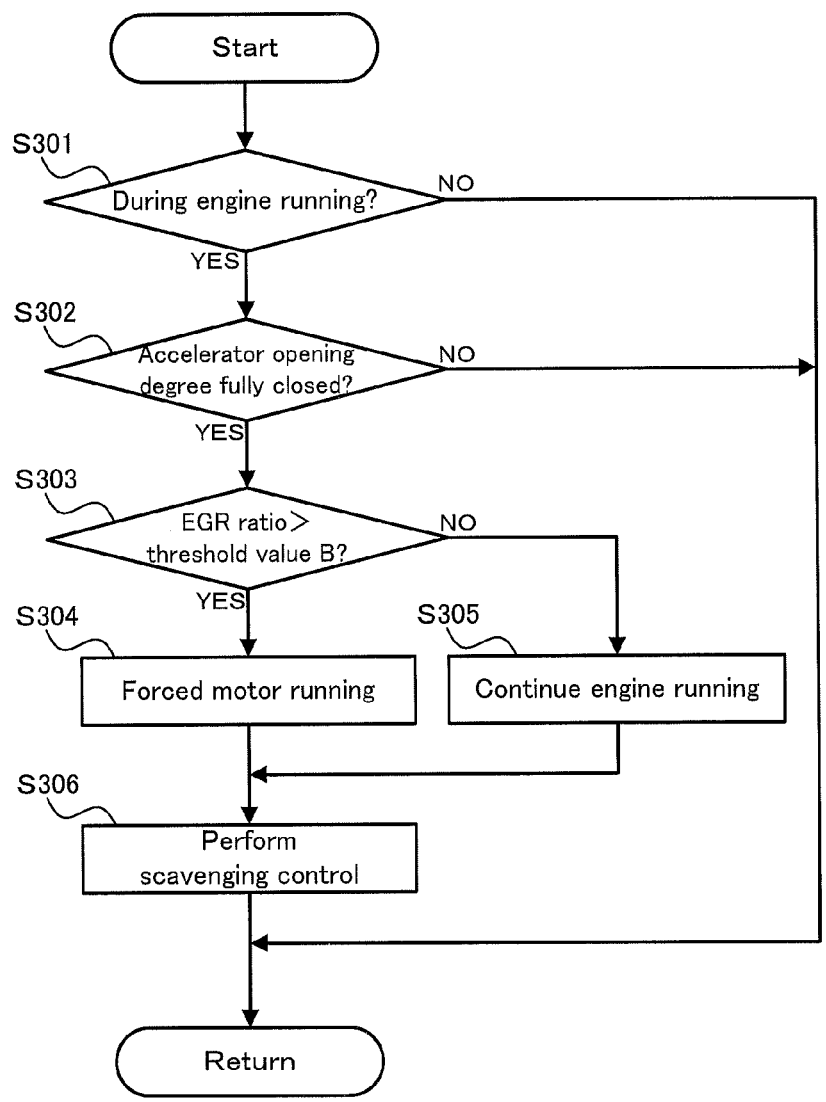
FIG. 13 is a flowchart illustrating operations of a control apparatus for a hybrid vehicle according to a reference example.

In FIG. 13, if an operation of the control apparatus for the hybrid vehicle according to the reference example is started, it is firstly determined on the hybrid ECU 60 whether or not the hybrid vehicle 1 is performing the engine running (i.e. the running in the HV mode) (step S301). If it is determined that the hybrid vehicle 1 is not performing the engine running (step S301: NO), the subsequent process is omitted. In other words, the same process as in the step S101 in the first embodiment or the step S201 in the second embodiment is performed (refer to FIG. 9 and FIG. 11).

On the other hand, if it is determined that the hybrid vehicle 1 is performing the engine running (step S301: YES), it is determined whether or not the accelerator is returned to be fully closed (step S302). If it is determined that the accelerator is not returned to be fully closed (the step S302: NO), the subsequent process is omitted.

On the other hand, if it is determined that the accelerator is returned to be fully closed (the step S302: YES), it is determined whether or not the present EGR ratio is greater than a predetermined threshold value B (step S303). The threshold value B is set as a value corresponding to the EGR ratio that does not unstabilize the combustion of the engine 200 (i.e. that can realize sufficient scavenging) even if the accelerator opening degree is set to be fully closed.

Here, if it is determined that the present EGR ratio is greater than the predetermined threshold value B (the step S303: YES), the running of the hybrid vehicle 1 is forcibly changed to the motor running (step S304), and the scavenging control by the motoring or the like is performed in the motor running (step S306). On the other hand, if it is determined that the present EGR ratio is less than or equal to the predetermined threshold value B (the step S303: NO), the hybrid vehicle 1 is maintained in the engine running (step S305), and the scavenging control is performed in the engine running (step S306).

According to a series of process operations described above, if it is determined that the EGR ratio when the accelerator opening degree is fully closed is high enough to cause the misfire, the running of the hybrid vehicle 1 is forcibly set to the motor running. It is thus possible to certainly prevent the misfire of the engine 200 even if the EGR ratio is high. Moreover, since the scavenging control in the motor running is performed, it is also possible to prevent the misfire at a restart of the engine 200.

(3-2) Control Example by Control Apparatus for Hybrid Vehicle According to Reference Example Next, a specific control example by the control apparatus for the hybrid vehicle according to the reference example will be explained with reference to FIG. 14. FIG. 14 is a time chart illustrating parameter variations in operation of the control apparatus for the hybrid vehicle according to the reference example.

In FIG. 14 it is assumed that the hybrid vehicle 1 sets a constant accelerator opening degree and performs the engine running. The accelerator opening degree of the hybrid vehicle 1 is reduced from a time point t11 and is set to be fully closed at a time point t12. Here, in particular, at the time point t12, the amount of the EGR gas in the cylinder is relatively large, and it is determined that there is a possibility of the misfire of the engine 200. Thus, at the time point t12, the engine 200 is stopped to change the running to the motor running, and the scavenging control by the motoring is started. This makes it possible to certainly prevent the misfire of the engine 200 caused by the retained EGR gas.

The first and second embodiments are explained on the premise that the hybrid vehicle 1 cannot perform the motor running if the battery SOC is low. In the reference example, the running is forcibly changed to the motor running even if the batter SOC is low. More specifically, unless there is an inconvenience worse than the misfire of the engine, the running is changed to the motor running.

By performing the scavenging control, the amount of the EGR gas in the cylinder becomes zero at a time point t13. Then, after a subsequent time point t14, the number of revolutions of the engine 200 can be increased to perform ignition again.

As explained above, according to the control apparatus for the hybrid vehicle in the reference example, if it is determined that there is not enough time to scavenge the EGR gas due to a sudden reduction in the accelerator opening degree, the motor running is forcibly realized, and then, the scavenging control is performed. It is therefore possible to certainly prevent the misfire of the engine 200.

The present invention is not limited to the aforementioned embodiments, but various changes may be made, if desired, without departing from the essence or spirit of the invention which can be read from the claims and the entire specification. A control apparatus for a hybrid vehicle that involves such changes is also intended to be within the technical scope of the present invention.

DESCRIPTION OF REFERENCE NUMERALS AND LETTERS

1 hybrid vehicle
7 drive shaft
13 drive gear
14 driven gear sensor group
17 operating apparatus
18 drive wheel
60 HVECU
61 vehicle speed sensor
62 accelerator opening sensor
63 MG1 number-of-revolutions sensor
64 MG2 number-of-revolutions sensor
65 drive shaft number-of-revolutions sensor
66 SOC sensor
70 MGECU
71 engine ECU
72 spark plug
101, 111 intake pipe
102 airflow meter
103 intake throttle valve
110 compressor
113 intercooler
120 turbine
115, 121 exhaust pipe
123 start converter
124 post-processing apparatus
125 EGR pipe
126 EGR valve
127 EGR cooler
200 engine
201 cylinder
210 injector
MG1, MG2 motor generator
S1, S2 sun gear
CA1, CA2 carrier
R1, R2 ring gear
C1 clutch

The invention claimed is:

1. A control apparatus for a hybrid vehicle, configured to control a hybrid vehicle,
   the hybrid vehicle including:
   a power source including an internal combustion engine and an electric motor; a recirculating pipe configured to recirculate an exhaust gas from an exhaust side to an intake side of the internal combustion engine; and
   a recirculation amount adjusting valve configured to adjust an amount of the recirculation by the recirculating pipe;
   said control apparatus comprising a processor and memory, configured to:
   determine whether electric running by the electric motor is capable of performing by stopping the internal combustion engine when the hybrid vehicle runs while operating the internal combustion engine; and
   control the recirculation amount adjusting valve such that the amount of the recirculation by the recirculating pipe is larger than an amount when it is determined that the electric running is not capable of performing when it is determined that the electric running is capable of performing, wherein
   said control apparatus controls the recirculation amount adjusting valve such that the amount of the recirculation by the recirculating pipe becomes larger as a difference becomes smaller between a present accelerator opening degree and an accelerator opening degree when the internal combustion engine is stopped.

2. The control apparatus for the hybrid vehicle according to claim 1, further comprising a motoring controller configured to control the electric motor to perform motoring of the internal combustion engine during the electric running.

* * * * *